Oct. 24, 1939.     R. L. MATTSON     2,177,147
APPARATUS FOR CUTTING GEARS
Filed Feb. 1, 1937     2 Sheets-Sheet 1

Oct. 24, 1939.  R. L. MATTSON  2,177,147
APPARATUS FOR CUTTING GEARS
Filed Feb. 1, 1937    2 Sheets—Sheet 2
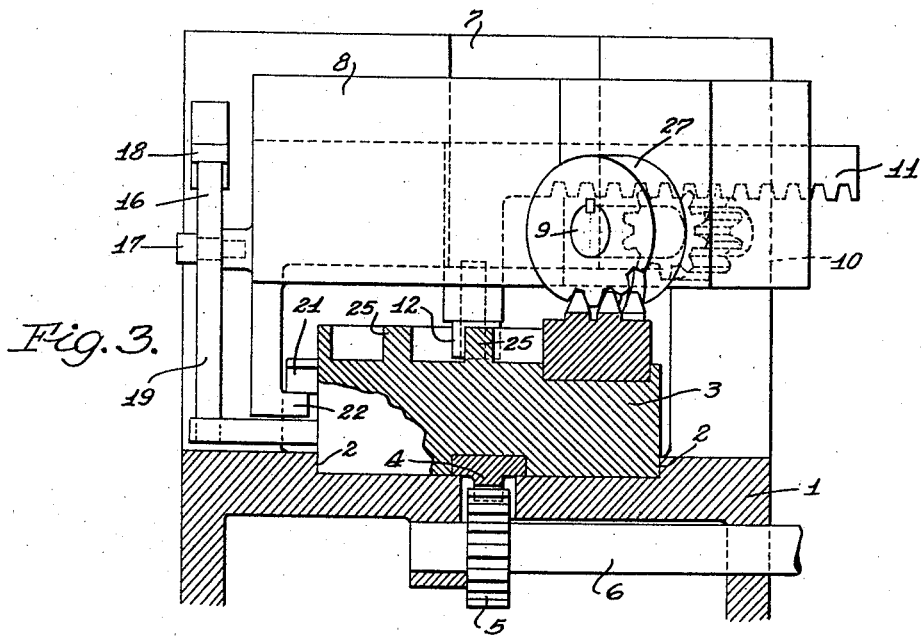
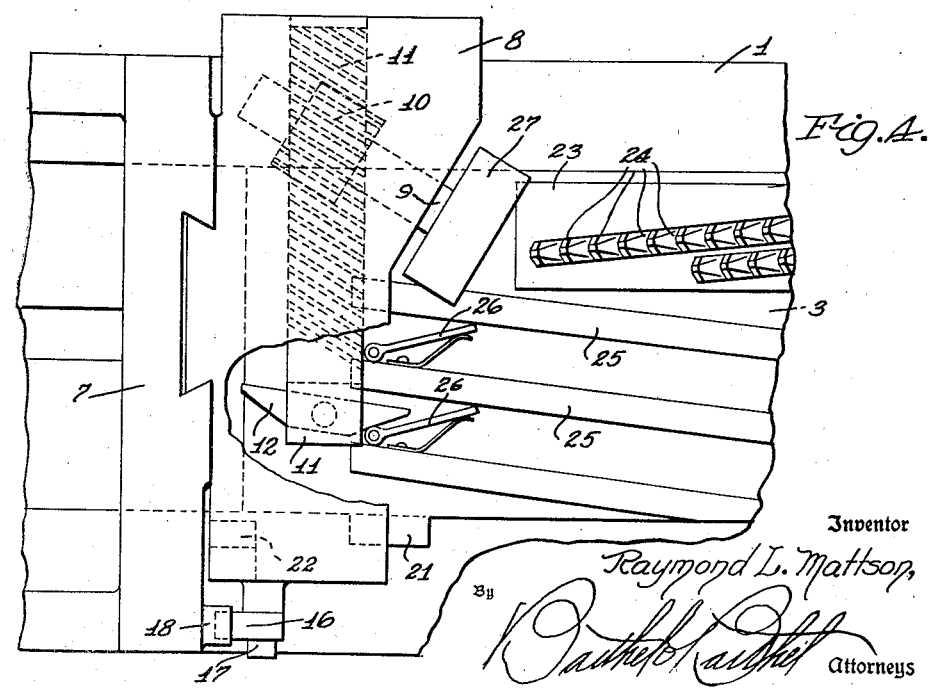
Inventor
Raymond L. Mattson,
By
Attorneys Patented Oct. 24, 1939

2,177,147

UNITED STATES PATENT OFFICE 2,177,147

APPARATUS FOR CUTTING GEARS

Raymond L. Mattson, Detroit, Mich.

Application February 1, 1937, Serial No. 123,412

4 Claims. (Cl. 90—9)

This invention relates generally to apparatus for cutting gears and more particularly to apparatus for broaching spiral gears.

The primary object of the present invention is to provide an improved broaching method and apparatus which is particularly adapted for producing gears according to the generating principle, whereby theoretically correct gear teeth may be formed. In other words, according to this invention the gear tooth is developed or generated by a predetermined relative movement between the gear blank and the cutting means, as distinguished from gear cutting methods and apparatus operating on the non-generating principle wherein a cutting tool is employed which has the same contour as the tooth spaces to be cut.

More specifically, the main object of the present invention is to provide a broaching method and apparatus for generating curved surfaces on various kinds of blanks, the main utility of the apparatus being, among the uses, the generating of gear tooth spaces in a blank both with high speed and accuracy. Generally speaking, high speed and accuracy have long been the aim of machines and methods for cutting gears, but have not been attainable by prior methods and apparatus without imposing undesirable strains on the apparatus or upon the gear blanks being cut. Merely increasing the speed of operation of a machine for cutting gears ordinarily imposes strains upon the machine and the gear blank and usually sets up jarring and chattering. According to the present method, however, the amount of time actually consumed in cutting a gear is comparatively small, the accuracy of the pitch, tooth contour and size of the teeth are controlled to a high degree of exactness, no excessive strains are placed upon the apparatus or gear blank, and jarring and chattering are practically eliminated.

It is well known to those versed in the art of cutting gears that if an ordinary rack is taken and a disk of soft or plastic material is rolled over the rack so that the teeth of the rack leave their impressions in the disk, the surfaces defining such impressions will not be straight or have the same angular relationship as the teeth of the rack, but will be curved in the form of involutes. The same condition results if the disk is rotated while the rack moves lengthwise in contact therewith in such manner that the teeth of the rack leave the impressions in the disk. This invention has as a further object to provide for the cutting of the tooth spaces in a rotating disk, rather than the deformation of the disk to provide such spaces, as in the case of the rack, or in other words, to attain the cutting function by related movements of the gear blank and the cutting tool which simulate the conditions referred to with respect to the relatively moving plastic blank and rack.

Another object of the invention is to provide a method of cutting gear tooth spaces wherein a tool, which because of its application is generally classed as a broach, is moved relative to a gear blank while the gear blank is rotated about its axis. The broach consists of series of rows or threads of cutting teeth which comprise a number of cutting teeth disposed one behind another, the teeth of each thread being identical in size and shape and having substantially the same cross sectional form as a tooth of a rack. The threads of the broach are disposed at such an angle that while the broach moves at an angle to the axis of rotation of the blank they reside parallel to said axis, in the case of a spur gear, or reside at an angle to the axis of rotation of the gear blank in the case of a helical gear, and in its passage through the gear blank each thread or series of teeth completes the formation of one tooth space. Therefore, by providing a broach having a series of threads corresponding in number to the gear tooth spaces, a gear may be completely formed by one stroke of the broach and a slight amount more than one complete revolution of the gear blank.

Another object of the invention is to provide apparatus for cutting gear tooth spaces comprising a broach formed with a series of rows or threads of cutting teeth, the number of threads corresponding to the number of gear tooth spaces, and means for causing relative movement between the teeth and a gear blank and for rotating the gear blank about its axis during such relative movement so that the threads of teeth function to successively form tooth spaces in the blank.

In the case of comparatively large gear blanks requiring the formation of a great number of tooth spaces it is sometimes impractical to complete the entire number of tooth spaces with one stroke of the broach. The reason for this primarily is that the broach would have to be of comparatively great length and the apparatus for moving the same would of necessity be correspondingly large. Accordingly it is another object of this invention to provide for successive operations of the broach and to provide for rotative movement of the blank to the position which is proper for the commencement of a successive stroke after the broach has completed one stroke and has been moved to its initial or starting position. With such a function possible no restriction is present with respect to the number of threads of cutting teeth required on the broach and one broach may be used for cutting tooth spaces in blanks requiring different numbers of spaces. For example, a broach capable of cutting a given number of spaces may be utilized to cut twice that number of spaces by providing two strokes thereof, regulating the rotative movement of the blank with respect to the movement of the broach, and indexing the blank rotatively between strokes.

With the above and other ends in view the invention is more fully disclosed in the following description referring to the accompanying drawings, in which Figure 1 is a top plan view;

Fig. 3 is a view taken on the line 3—3 of Fig. 2, and

Fig. 4 is a plan, with parts broken away.

Like characters of reference are employed throughout to designate corresponding parts.

Figure 1:
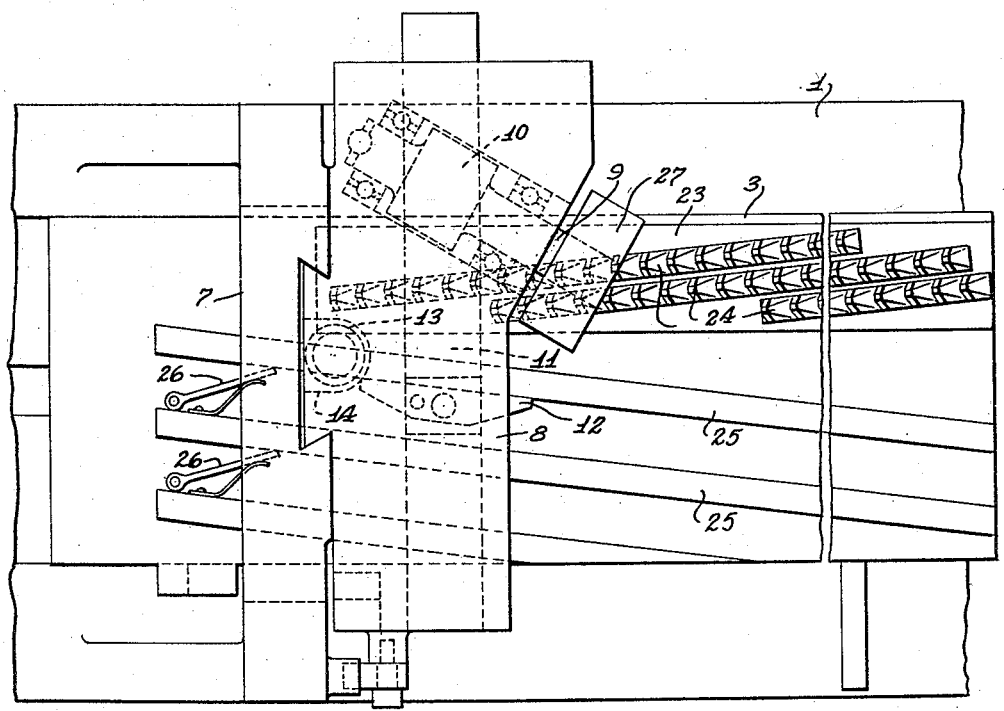

The numeral 1 designates a machine table having guides 2 in which is slidably received a broach bar 3. Secured to the bottom of the bar 3 is a rack 4 with which a gear 5 on a shaft 6 meshes. It is apparent that the broach bar 3 may be moved lengthwise in the guides 2 by rotating the shaft 6. No means has been shown for rotating the shaft 6 because such means is already well known to the art and forms no part of this invention.

Figure 2:
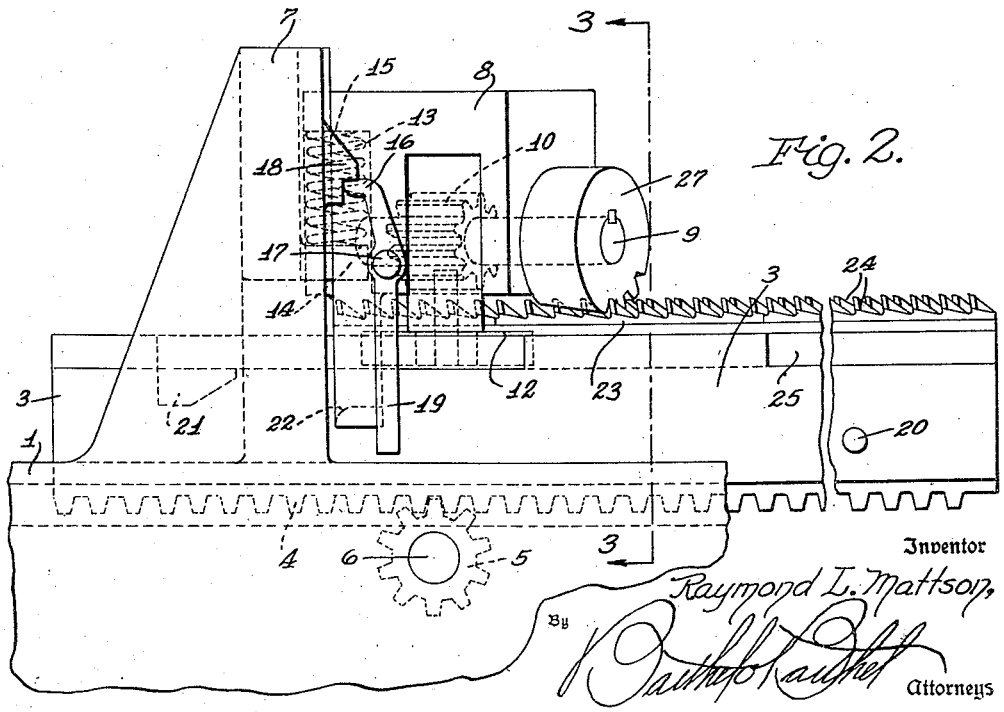
Fig. 2 is a side elevation.

Mounted upon the table 1 is a vertical guide 7 slidably receiving an arbor support 8 in which is rotatably mounted an arbor or blank support 9. On the arbor 9 is a gear 10 which constantly meshes with a rack 11, the latter being slidably mounted in the guide and having a depending shoe 12 on one end thereof normally disposed adjacent the top of the sliding bar 3. A spring 13 is compressed between a lug 14 on the guide 7 and a lug 15 on the arbor support and normally urges movement of the arbor support vertically. As shown in Fig. 2, a latch 16 is fulcrumed at 17 upon the arbor support 8 and normally engages a lug 18 on the guide 7 to hold the spring 13 in compression and the arbor support 8 in a lowered position. In order to provide for the automatic release of the latch 16 and to permit the arbor support to be raised by the spring 13 a finger 19 is provided on the latch. The finger 19 extends into the path of movement of a pin 20 carried by the broach bar 3 and when the latter is moved toward the left hand side, from the position shown in Fig. 2, the pin 20 strikes the finger 19, causes the latch 16 to swing on its fulcrum to disengage the lug 18, and permits the spring 13 to elevate the arbor support 8.

After completion of the function described immediately above, the broach bar 3 is moved toward the right hand side of Fig. 2 and a cam 21, mounted upon the bar 3, engages a cam 22 carried by the arbor support 8 and pulls the arbor support downwardly against the pressure of the spring 13. The finger 19, through force of gravity, moves the latch 16 into engagement with the lug 18 and the arbor support is again locked in its lowered position.

Mounted upon the slidable bar 3 is a broach 23. The broach consists of a series of rows or threads of cutting teeth 24, each thread comprising a plurality of cutting faces arranged one behind another with the several cutting faces identical and having a contour substantially the same as the cross section of a tooth of a rack. The threads are parallel and are disposed at an angle to the direction the broach travels, upon movement of the bar 3. While cutting gear tooth spaces, the sides of the cutting teeth, as well as the top, do cutting, and clearances are provided at the top and both sides of each tooth.

Mounted upon the sliding bar 3 are a plurality of parallel cam bars 25 adapted to be engaged by the shoe 12, as shown in Fig. 1. Adjacent the ends of the cam bars 25 are spring pressed fingers 26 having a function which will hereinafter appear.

With a gear blank 27 keyed or otherwise secured upon the arbor or blank support 9 and the arbor support latched in its lowered position, the sliding bar 3 is moved. As the bar 3 moves toward the left hand side of Fig. 2 the several threads of teeth 24 are successively presented to the blank 27. The first cam bar 25 engages the shoe 12, during such movement of the bar 3, and through engagement with the shoe causes sliding movement of the rack 11. Sliding movement of the rack 11 imparts rotation to the gear 10, to the blank support 9 and to the gear blank 27 carried thereby. The gear blank, therefore, is constantly rotated, in timed relation to the presentation of the threads of cutters and simultaneous with the presentation of the threads. It becomes obvious, therefore, that while the teeth of any thread are passing through the gear blank the latter will, to a definite extent, be rotated, with the result that a generating action takes place.

In the drawings, the arbor or blank support 9 is illustrated as supported for rotation about an axis parallel to the horizontal plane of travel of the broach 23 and at an angle to the vertical plane through which the broach travels. This angle in the case of spur gears is equal to the angle between the threads of teeth 24 and the direction of travel of the broach bar. In the case of the spiral gears this angle equals the helix angle of the gear plus or minus the angle between the threads 24 and the direction of travel of the broach bar.

By forming the broach sufficiently long to present threads to the blank during rotation of the blank through approximately three hundred and sixty degrees, a gear may be completely formed by one pass of the broach. When the broach has completed its work stroke, the pin 20 strikes the finger 19, trips the latch 16, and the arbor support 8 is raised by the spring 13 so that the broach may be returned to its starting position without engaging the blank. During such movement, the shoe 12 is also elevated from the cam bar 25. During the return stroke or after completion of the same, the cut blank may be replaced by a new blank and the arbor 9 rotated manually to restore the rack 11 to its original position. The cam 21 then engages the cam 22 and pulls the arbor support downwardly and the latch 16 engages the lug 18 to hold the arbor support down, in position for the next work stroke of the broach.

In some cases, the number of tooth spaces exceeds that which is practical with one stroke of the broach. In such a case, after completion of one stroke the shoe 12 will be disposed in the position shown in Fig. 4, which is slightly spaced from the second of the series of cams 25. After the arbor support has been lowered as above described, and the sliding bar 3 is again moved in the work stroke direction, the spring finger 26 engages the shoe 12 and presses it into engagement with the second cam bar. In order for it to do so, it is necessary to slide the rack 11 in the direction reverse to that which the cams 25 tend to move it. This reverse movement imparts rotative movement to the blank support 9 and moves the blank to the position which is correct for the start of the cutting function resulting from the next work stroke of the broach.

Although a specific embodiment of the invention has been illustrated and described it will be understood that various changes may be made within the scope of the appended claims without departing from the spirit of the invention, and such changes are contemplated.

What I claim is:

1. In a gear cutting apparatus, a reciprocal broach having a plurality of cutting elements, a rotatable support for a gear blank, means to move said broach and rotate said support, said support also being bodily movable from one position in which the gear blank is held in cutting relation with the broach to a second position in which the gear blank is moved out of cutting relation with the broach, spring means operable to move said support to said second position, latch means operable in one position to restrain said spring means, means carried by said broach for actuating said latch means to release said spring means upon predetermined movement of said broach in one direction, and means carried by said broach to relatch said latch means upon predetermined movement of said broach in the opposite direction.

2. In a gear cutting apparatus, a reciprocal broach, a rotatable support for a gear blank held in cutting relation with said broach, means to reciprocate said broach, cam means movable with said broach and having a cam surface extending longitudinally of the direction of movement of said broach, a gear to rotate said support, a gear rack cooperable with said gear and reciprocal in a direction transverse to the direction of movement of said broach, and cam follower means carried by said rack and cooperable with said cam means to move said rack.

3. In a gear cutting apparatus, a reciprocal broach, a rotatable support for a gear blank held in cutting relation with said broach, means to reciprocate said broach, cam means movable with said broach and having a cam surface extending longitudinally of the direction of movement of said broach, a gear to rotate said support, a gear rack cooperable with said gear and reciprocal in a direction transverse to the direction of movement of said broach, and cam follower means carried by said rack and cooperable with said cam means to move said rack, and resilient means operable to urge said follower member into engagement with said cam surface upon predetermined movement of said broach in one direction.

4. In a gear cutting apparatus, a reciprocal broach, means to move said broach, a rotatable support for a gear block held in cutting relation with said broach, a plurality of spaced cams having substantially parallel cam surfaces extending longitudinally of the direction of movement of said broach and at an angle thereto, a gear to rotate said support, a rack cooperable with said gear and reciprocal transversely to the direction of movement of said broach, a cam follower carried by said rack and cooperable with one of said cam surfaces to move said rack during the cutting of teeth in a portion of the periphery of the blank in one stroke of said broach, said rack being movable to position said follower for cooperation with another of said cam surfaces during the next stroke of said broach, and spring means operable upon initial movement of said broach in one direction to move said follower into engagement with said second-named cam surface and to rotate said blank to the proper position for continuation of the cutting of the blank.

RAYMOND L. MATTSON.